United States Patent
Puri et al.

(10) Patent No.: US 7,500,046 B1
(45) Date of Patent: Mar. 3, 2009

(54) ABSTRACTED HOST BUS INTERFACE FOR COMPLEX HIGH PERFORMANCE ASICS

(75) Inventors: Rahoul Puri, Los Altos, CA (US); Arvind Srinivsan, San Jose, CA (US); Carl Childers, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 85 days.

(21) Appl. No.: 11/418,901

(22) Filed: May 4, 2006

(51) Int. Cl.
*G06F 13/36* (2006.01)

(52) U.S. Cl. .................. 710/311; 710/305; 710/306; 710/5; 714/715

(58) Field of Classification Search ......... 710/305–306, 710/311, 5; 714/715
See application file for complete search history.

(56) References Cited

U.S. PATENT DOCUMENTS

| | | | |
|---|---|---|---|
| 5,974,456 A * | 10/1999 | Naghshineh et al. | 709/223 |
| 2003/0177201 A1 * | 9/2003 | Shen | 709/218 |
| 2005/0165974 A1 * | 7/2005 | Tanioka | 710/1 |

* cited by examiner

*Primary Examiner*—Clifford H. Knoll
*Assistant Examiner*—Kim T Huynh
(74) *Attorney, Agent, or Firm*—Park, Vaughan & Fleming LLP

(57) ABSTRACT

An interface is provided to couple an input/output device (e.g., a network interface unit) to one or more different host system buses without altering the configuration of the device (e.g., to include logic specific to the host buses). Functionality of the device (e.g., MTU size, error detection) is therefore independent of the host bus. Host bus logic for managing operation of the host bus is augmented with logic for translating between semantics of the interface and the host bus. Also, end-to-end verification of a complex ASIC in multiple configurations or environments can be performed over the interface without probing into the ASIC.

4 Claims, 10 Drawing Sheets

US 7,500,046 B1

ABSTRACTED HOST BUS INTERFACE FOR COMPLEX HIGH PERFORMANCE ASICS

RELATED APPLICATION

This application is related to U.S. patent application Ser. No. 11/418,900, entitled "Method and Apparatus for Recovering from System Bus Transaction Errors" which was filed on May 4, 2006 and is incorporated herein by reference.

BACKGROUND

This invention relates to the field of computer systems. More particularly, an interface is provided for coupling an input/output device to any of multiple types of host buses.

Many computer system devices or components, such as network interface units or adapters, storage devices, peripheral devices, and so on, initiate input/output operations using DMA (Direct Memory Access) over a host computer's system bus. Split transactions are often enabled to allow improved access to the bus by bus clients.

When split transactions are enabled for read operations, a single read transaction from the device generates two separate system bus transactions: one to issue the read request, and one to return the requested data. In between the two transactions, the system bus is released for use by other devices. If split transactions are not enabled for read operations, the system bus is not relinquished by a component that issued a read request until the requested data were returned.

When split transactions are enabled for write operations, a device that issues a non-posted write operation releases the system bus once the operation has been transferred to the DMA bridge. If split transactions are not enabled for writes, the system bus is not released until acknowledgement of completion of the non-posted write.

Characteristics of read and non-posted write transactions differ, depending on the architecture of the computer system. For example, different types of system buses, such as PCIe (Peripheral Component Interconnect Express) and HT (Hyper Transport), allow data transfers of different maximum sizes, may involve different expected or allowable latencies, etc. Some systems do not even allow or support non-posted writes.

Because each system bus transaction is relatively low-level, usually involving the transfer of a small amount of data, one read operation (e.g., to retrieve data to be transmitted in one packet over a network) or one write operation (e.g., to write the contents of one packet received from a network) may require a number of system bus transactions. If the device is only capable of tracking the statuses of a limited number of system bus transactions, the device may stall whenever the total number of transactions in-flight reaches that number.

Traditionally, a device configured to generate read or write transactions over a system bus has contained built-in logic for detecting and possibly handling errors that occur during the transactions. Typically, different versions of the device would be designed and produced for each type of system bus. Attempting to configure the device to work with any of multiple different system buses would require the device to include logic capable of tracking transactions for each type of system bus, and would make the design too complex and/or inefficient.

In addition, verification strategies for verifying correct operation of an input/output device have generally be tightly coupled to the design of the device. For example, to verify a complex ASIC, each module of the ASIC is usually verified separately with a testbench tailored to the module. Any change to a module would require a corresponding change to the testbench. And, the correctness of the verification is highly dependent on the accurate modeling of the behavior of other modules that interact with the module being tested.

Further, complex chips such as ASICs and input/output interfaces are typically designed for use in a specific architecture (e.g., with one type of host bus). Because such a chip connects only to a single bus, a simplified verification strategy is often implemented to verify the chip with that architecture. Even if such a chip could be designed for use with multiple different architectures or host buses, conventional wisdom would call for a separate verification strategy for each architecture. This would significantly increase the complexity and require substantial time to verify the chip.

SUMMARY

An interface is provided to electrically couple an input/output device (e.g., a network interface unit) to one or more different host system buses without altering the configuration of the device (e.g., to include logic specific to the host buses). Because the interface can be implemented with any of the buses, functionality of the device (e.g., MTU size, error detection) is independent of the host bus. Host bus logic (e.g., glue logic) for managing operation of the host bus is augmented with logic for translating between semantics of the interface and the host bus.

Also, end-to-end verification of a complex ASIC in multiple configurations or environments can be performed over the interface without probing into the ASIC. The verification allows correct operation of the ASIC to be examined on a macro-level rather than the micro-level of each component or module of the ASIC.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, an input/output interface is provided for interfacing an I/O device with a computer system's host bus. The interface is designed to couple the device to any of multiple different host buses (e.g., PCIe, HT, JBus) and allows the device's functionality (e.g., MTU size, error detection) to be independent of the host bus.

The interface may be implemented to function with various computer system components that perform input/output, such as a network interface unit (NIU), storage device, sound card, graphics device, or any other device that communicates across a host bus. The interface may also be employed to couple one host bus to another host bus. In embodiments of the invention described here, the interface is referred to as a "meta" interface.

In another embodiment of the invention, a method is provided for performing end-to-end verification of a complex ASIC (Application-Specific Integrated Circuit), wherein the ASIC may be tested in different configurations (e.g., with different host buses) in a unified manner. In one implementation, the method enables verification of a meta interface and an attached input/output device with any one of a number of different host buses.

One Embodiment of a Meta Interface

Figure 1:
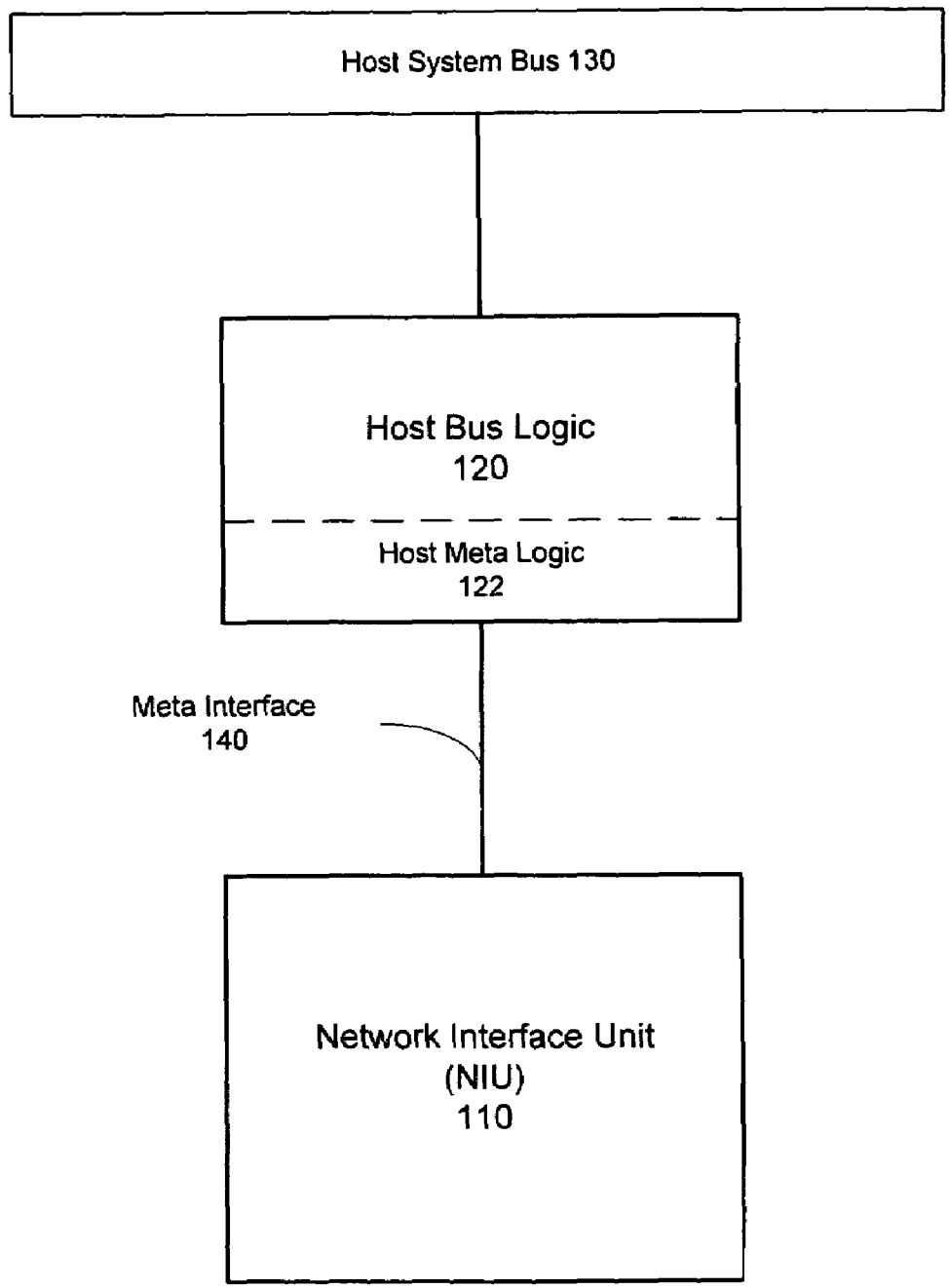
FIG. 1 is a block diagram depicting a meta interface for coupling an input/output device to any of multiple host system buses, in accordance with an embodiment of the present invention.

FIG. 1 is a block diagram depicting the implementation of one embodiment of a meta interface in conjunction with a network interface unit (NIU). Meta interface 140 couples NIU 110 to host bus logic 120. Host bus logic 120 is coupled to host system bus 130, and may be part of a bridge (e.g., a Northbridge), switch, root complex or other component configured to communicate over the host system bus. In other embodiments of the invention, some other type of input/output device may be substituted for NIU 110 (e.g., a disk controller, a SCSI controller, a USB hub).

The host system bus may conform to any of a variety of bus architectures, such as PCIe (Peripheral Component Interconnect Express), SIU (System Interface Unit), HT (Hyper Transport), Jbus, etc. Host bus logic 120 may thus comprise PEU (PCIe Unit) glue logic, SMX (SIU Meta Interface) glue logic, HT glue logic or other glue logic designed to translate between input/output operations initiated by a input/output device (e.g., NIU 110) and transactions performed on a system bus as part of an input/output operation. An embodiment of the invention may therefore be implemented with virtually any host bus and host bus logic now known or hereafter developed.

In the embodiment of the invention depicted in FIG. 1, NIU 110 may be implemented with different host bus logic modules and corresponding system buses, without modification. More specifically, NIU 110 is not limited to operation with any particular host system bus because host bus logic 120 translates between host bus semantics and NIU semantics, thereby relieving the NIU from having to monitor system bus transactions.

Because the input/output device (NIU 110) is operable with different system bus architectures, only one verification scheme need be implemented, as described in a following section. And, because the device operates the same in each case, its integrity is more certain.

In one implementation, meta interface 140 of FIG. 1 provides a point-to-point link comprising three functional groups, Request, Response and Acknowledgement, each having a separate queue. The queues may operate independently of each other. The use of separate queues and separate signal conductors helps prevent blocking or starvation.

The Request queue issues Command requests and transmits payloads (e.g., payloads of packets received by NIU 110 from a communication link) from the NIU, through host bus logic 120 to host bus 130. The host bus logic translates received Request queue commands into appropriate host bus transactions. For example, for a PCIe host bus, the host bus logic (as augmented by host meta logic 122) would translate a Request queue command into PCIe TLP (Transaction Layer Protocol) format. The Request portion of the meta interface may comprise separate buses for reads and writes.

The Response queue receives Command responses and payloads (e.g., for packets to be transmitted by NIU 110) for the NIU from the host bus, through the host bus logic. The Command responses may comprise translations of host bus transactions received by the host bus logic. Infinite Response queue credits may be provided.

The Acknowledgement queue indicates when non-posted write requests have been completely serviced. Thus, if a non-posted write of 1 KB is segmented into four 256 byte write transactions over host system bus 130, an Acknowledgement is generated only after the final write transaction is scheduled from the host bus logic (if non-posted writes are not supported by the host bus), or only after all segments have been written (if non-posted writes are supported).

Figure 2:
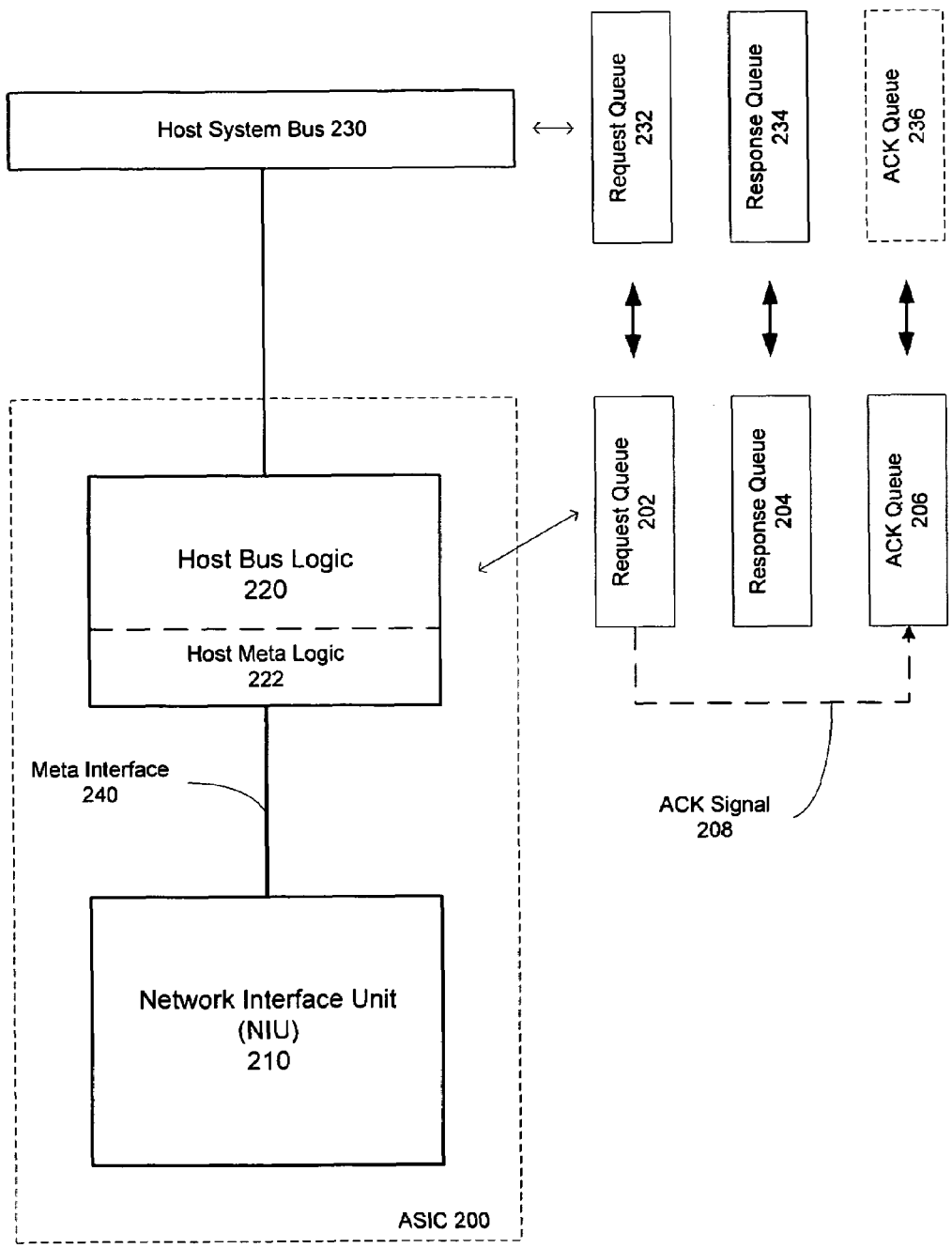
FIG. 2 is a diagram of three queues implemented to facilitate operation of the meta interface of FIG. 1, in accordance with an embodiment of the invention.

FIG. 2 demonstrates the use of separate Request, Response and Acknowledgement queues for a complex, high performance ASIC employing meta interface, according to one embodiment of the invention.

In FIG. 2, ASIC 200 includes NIU core 210 and host bus logic 220, coupled by meta interface 240. Implemented within the host bus logic (e.g., within host meta logic 222) are the three queues—request queue 202, response queue 204 and acknowledgement queue 206.

Request queue 202 stores read requests and write requests to be issued to host bus 230. The read and write requests may be queued concurrently or the request queue may comprise separate queues for the different types of requests.

For each read request issued to the host, a response is normally received in response queue 204. The response may report an error or success status. As described further below, if an error is reported, corresponding read request tags may be marked as dirty to prevent their reuse (e.g., until the error is cleared).

For each non-posted write request issued to host bus 230 from request queue 202, a write acknowledgement is normally received in acknowledgement queue 206. However, acknowledgements of non-posted writes are reported to NIU 210 only in the correct order. For example, any posted write requests that were issued prior to a non-posted write request must be committed to memory first. Illustratively, upon receipt of a non-posted write acknowledgement, host bus logic 230 may read from target addresses of prior posted write requests (if any) to ensure they have been committed, before reporting the non-posted write ACK. The host bus logic therefore ensures correct ordering of all acknowledgements.

In FIG. 2, the host bus implements request queue 232 for receiving read and write requests from request queue 202, and also implements response queue 234 for issuing to response queue 204 responses to read requests. The host bus may or may not implement acknowledgment queue 236 for issuing acknowledgements of non-posted write requests to queue 206. If ACK queue 206 is not implemented, host bus logic 220 issues artificial or pseudo acknowledgements to ACK queue 206 (e.g., via ACK signal 208) for non-posted write requests issued from request queue 202. These artificial acknowledgements may be sent immediately or after some delay.

Thus, in the embodiment of the invention depicted in FIG. 2, regardless of how the host bus handles requests and regardless of which queues the host does and does not implement, NIU core 210 will observe the same behavior and can therefore operate in the same manner regardless of the host bus configuration. Meta interface 240 concurrently carries contents of Request queue 202, Response queue 204 and Acknowledgement queue 206 between host bus logic 220 and NIU 210.

Each input/output operation issued by NIU 110 of FIG. 1 (e.g., to read from or write to memory via DMA) is assigned an operation identifier from a pool of reusable identifiers. Each such operation is a complete operation from the point of view of the NIU. Thus, a write operation to write the contents of a packet received from a network may involve the writing of a relatively large block of data (e.g., 4 KB). A read operation associated with the transmission of a packet similarly may involve the retrieval of the entire payload of the packet.

As one skilled in the art will appreciate, the scope or size of an input/output operation issued by the NIU may be larger than the scope or size of transactions issued over host system bus 130. Therefore, one operation issued by NIU 110 may cause host bus logic 120 to spawn multiple system bus transactions if the host bus MTU (Maximum Transfer Unit) is smaller than the MTU of meta interface 140 (e.g., 4 KB). In one embodiment of the invention, the host bus logic primarily uses split transactions to conduct input/output operations requested by the NIU, particular read operations.

The NIU maintains a limited number of operation identifiers (e.g., 32 for PCIe) to assign to the input/output operations it issues. In one implementation, the limited pool of operation identifiers may be used only for split read operations and split non-posted write operations (i.e., read operations that will spawn split read transactions, and non-posted write operations that will spawn split non-posted write transactions). After an operation that a particular identifier is assigned to completes successfully, the identifier can be reused for another operation.

However, in one embodiment of the invention, when the NIU is informed by the host bus logic that a system bus transaction issued in conjunction with an input/output operation failed, the NIU treats the entire operation as having failed. The corresponding operation identifier is then marked (e.g., placed in a "dirty" bin) to prevent its reuse. In this embodiment, only after the error condition is cleared by software will the "dirty" operation identifier be allowed to be reused. By marking the operation identifier as dirty, the problem of ghost data is eliminated.

In particular, two types of ghost data are suppressed. One type of ghost data (which may be termed "transaction-level" ghost data) results from a system bus transaction spawned by an input/output operation after the failure of a previous transaction spawned by the same operation. Another type of ghost data (which may be termed "operation-level" ghost data) includes data that are received in response to a particular input/output operation, but only after a later operation having the same operation identifier is issued.

In the embodiment of the invention illustrated in FIG. 1, to facilitate the separation of NIU 110 from the host computer system bus, host bus logic 120 includes host meta logic 122. Host meta logic 122 is specific to the type of host bus; thus different host meta logic is included in different types of host bus logic used with different host bus types (e.g., PCIe, SIU, HT).

Host meta logic 122 receives read and write requests from NIU 110, via meta interface 140, and initiates corresponding transactions on system bus 130. Each such system transaction may be handled in a normal manner by host bus logic 120 and system bus 130.

A table or other structure may be maintained by the host bus logic or NIU 110, to map an operation's operation identifier to the transaction identifiers of the corresponding system bus transactions. Each entry in the table corresponds to a read or write operation, using the corresponding operation identifier as the entry's address, and includes fields for each system bus transaction issued on behalf of the operation. Maintaining the table in the host bus logic may promote abstraction of host buses.

Different arbiters may be employed in NIU 110 for issuing split read operations and split non-posted write operations. The host bus logic (meta logic 122) may therefore include a (programmable) threshold indicating a maximum number of either type of operation that may be in flight at one time.

Host meta logic 122 tracks completion of system bus transactions by receiving a response (e.g., to a split read transaction), identifying the response by its transaction identifier, mapping the transaction identifier to the corresponding operation identifier, and updating its status. Each successful split read transaction may be reported or forwarded back to the NIU as it is completed, in which case the NIU may reorder the read data as needed. Each successful non-posted write is reported to the NIU only when the final corresponding system bus transaction is dispatched and/or completed.

Thus, errors on system bus 130 need not be directly reported to NIU 110. Instead, any recoverable errors are recovered, and any time-outs or other non-recoverable errors cause host bus logic 112 (e.g., host meta logic 122) to signal a failure to the NIU. Illustratively, the failure is reported with the corresponding operation identifier, thereby allowing the NIU to remain isolated from operation of the system bus. The host bus logic may then drop any further data it receives from the system bus that corresponds to the same operation.

Figure 3:
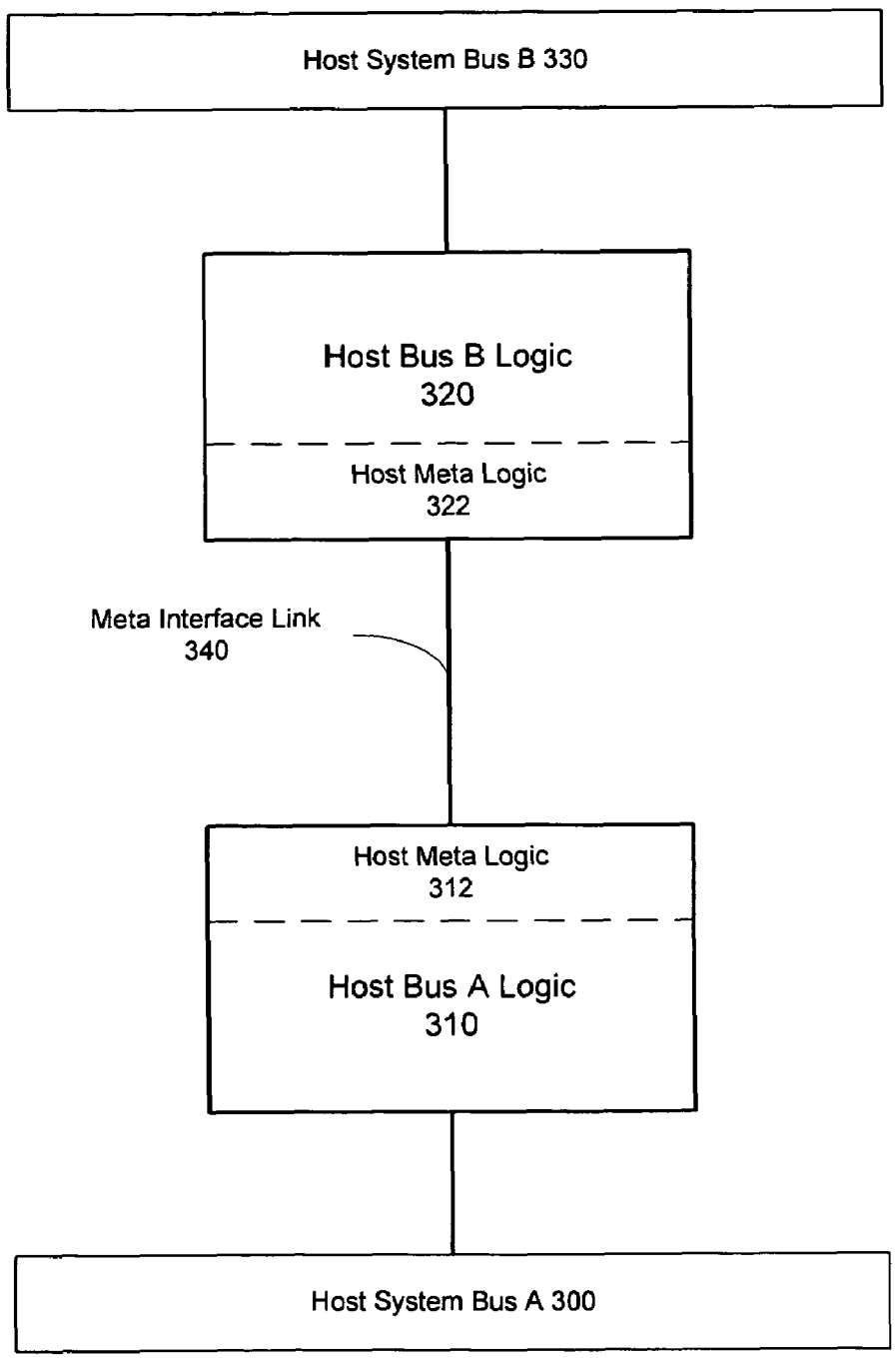
FIG. 3 is a block diagram depicting the use of a meta interface to couple two host buses, in accordance with an embodiment of the present invention.

FIG. 3 illustrates the configuration of an apparatus for bridging host buses and recovering from a host system bus error, according to an alternative embodiment of the invention. In FIG. 3, system buses A 300 and B 330 are coupled via corresponding bus logic 310, 320 and meta interface link 340. Any types of input/output devices may be coupled to the host buses, including storage devices, communication devices and so on.

In this embodiment of the invention, host bus A logic 310 includes host meta logic 312, and host bus B logic 320 includes host meta logic 322. Meta logic 312, 322 operate in similar fashion to meta logic 122 of FIG. 1.

In particular, because either host bus may operate with an MTU larger than the other, an input/output operation initiated on a host bus having a larger MTU may spawn multiple transactions on the other host bus. Therefore, a method of recovering from a system bus transaction error described herein may be implemented in host meta logic 312, 322, to prevent reuse of an operation identifier that was assigned to the operation that incurred the error.

Figure 4:
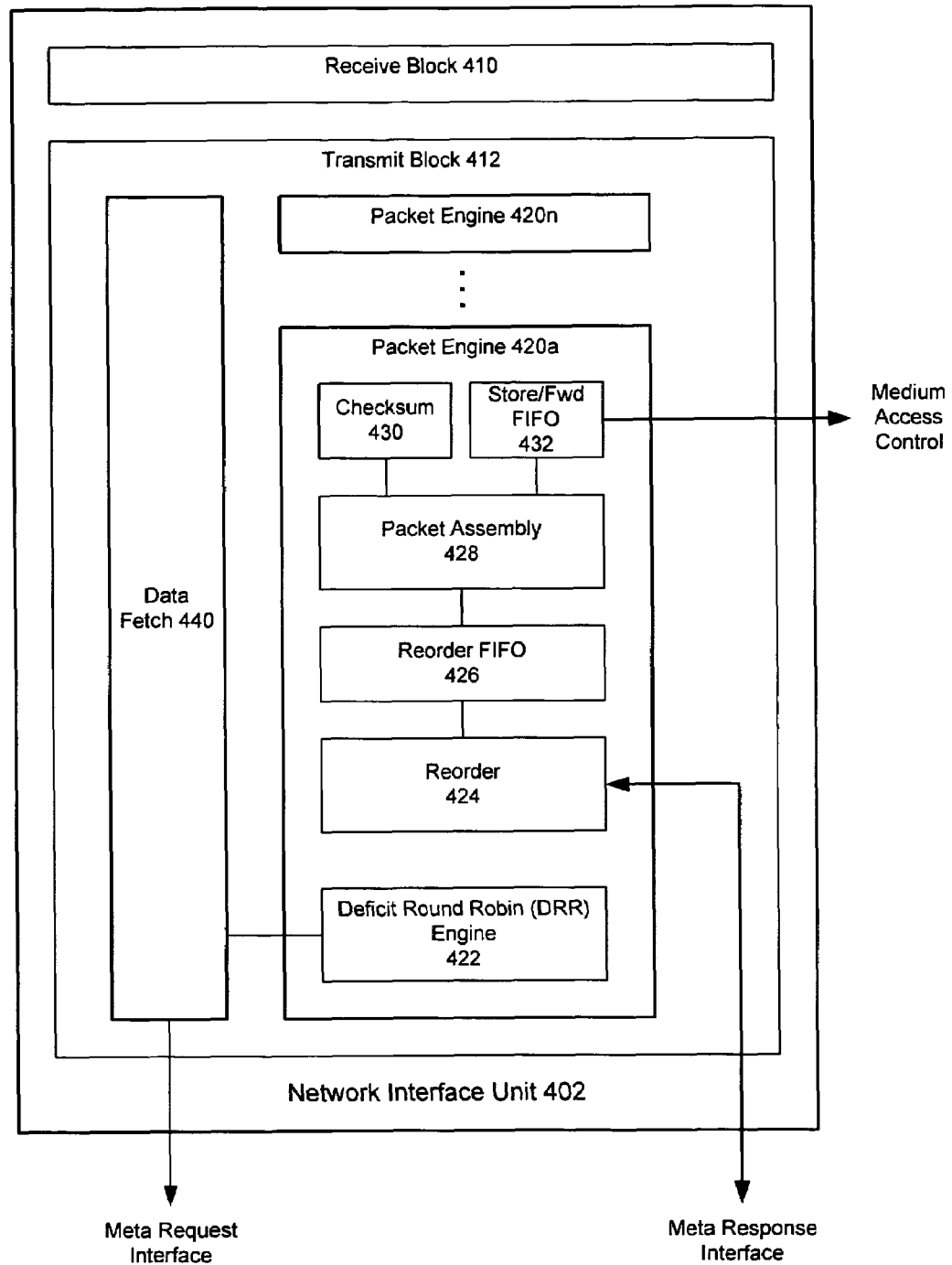
FIG. 4 is a block diagram depicting a network interface unit with which an embodiment of the present invention may be implemented.

FIG. 4 is a block diagram of a network interface unit (NIU) with which an embodiment of the invention may be implemented. In this embodiment, NIU 402 includes two blocks: receive (Rx) block 410 and transmit (Tx) block 412.

The Rx block receives data (e.g., packets, frames, cells) over a communication link (e.g., a network connection) and forwards the data to memory or other storage. The Tx block retrieves data from memory or some other system component, and sends it over the communication link in the form of packets or other constructs. The structure and operation of Rx block 410 may be discerned from the following description of Tx block 412.

Transmit block 412 includes a transmit controller (TXC) comprising any number of DMA packet engines 420 (i.e., engines 420*a*-420*n*), and data fetch module 440. In one implementation, four packet engines are employed: two for use with 10G MAC modules and two for use with 1G MAC modules. Tx block 412 and/or other components of NIU 402 may also include DMA engines.

Data fetch module 440 issues read operations to the host bus logic via the REQUEST queue of the meta interface. RESPONSE queue of the meta interface and reorders it with the assistance of reorder FIFO queue 426. After the data for a packet (or other transmission construct) is reordered, it is fed to packet assembly module 428, which adds headers and formats the data as necessary. Checksum module 430 calculates a checksum on the packet, if enabled, and store/forward FIFO queue 432 feeds the packet to a MAC (Medium Access Control) module for transmit or dispatch.

The diagram of FIG. 4 omits some components involved in the processing of incoming and outgoing communications.

In one embodiment of the invention, the REQUEST portion of a meta interface comprises two separate and independent buses, one for writes and the other for reads. This design helps alleviate head-of-queue blocking of read request operations during the servicing of a write request. Illustratively, the host bus logic (HBL) connected to the meta interface may interleave (on the host system bus) read and write transactions from concurrent I/O operations.

Programmed input/output (PIO) responses may also be interleaved. TABLE 1 lists the REQUEST signals employed on the write bus in an embodiment of the invention.

TABLE 1

| Signal Name | Size | From → To | Description |
|---|---|---|---|
| Transaction Type and Control Signals | | | |
| req_cmd | 8 | Meta → HBL | Commands: Write, Posted Write & Flush<br>[7:6] Reserved<br>[5] Posted = 1, Non-posted = 0<br>[4] Ordered = 1, Non-ordered = 0<br>[3] 64-bit addressing = 1, 32-bit addressing = 0<br>[2:0] Write = 001, Others reserved |
| req_address | 64 | Meta → HBL | Memory address |
| req_length | 14 | Meta → HBL | Data length (bytes) |
| req_opID | 6 | Meta → HBL | Operation identifier |
| req_port_num | 2 | Meta → HBL | Port number |
| req_dma_num | 5 | Meta → HBL | Channel number |
| req_client | 8 | Meta → HBL | Requesting client |
| req | 1 | Meta → HBL | REQUEST queue request |
| transfer_complete | 1 | Meta → HBL | Transfer complete (coincides with last data) |
| req_accept | 1 | HBL → Meta | Grant REQUEST queue request |
| Data and Data Control Signals | | | |
| data_req | 1 | HBL → Meta | Meta request for memory line transfer |
| data | 128 | Meta → HBL | Data (transferred in memory line units) |
| req_byteenable | 16 | Meta → HBL | First/last byte enable |
| status | 4 | Meta → HBL | Transfer status:<br>[3:0] Reserved |
| data_valid | 1 | Meta → HBL | Data transfer acknowledged |
| Error Flag | | | |
| req_errors | 1 | HBL → Meta | Flag to report errors. Asynchronous with respect to write REQUEST events |

Packet engine 420*a* includes DRR (Deficit Round Robin) engine 422, which is configured to generate read operations for the data fetch module to issue to the host bus logic.

Packet engine 420*a* also includes several modules for handling data received in response to a read operation and preparing the data for transmission. Illustratively, reorder engine 424 receives the data from the host bus logic via the TABLE 2 lists the REQUEST signals employed on the read bus in an embodiment of the invention.

TABLE 2

| Signal Name | Size | From → To | Description |
|---|---|---|---|
| Transaction Type and Control Signals | | | |
| req_cmd | 8 | Meta → HBL | Commands: Read<br>[7:5] Reserved<br>[4] Ordered = 1, Non-ordered = 0<br>[3] 64-bit addressing = 1, 32-bit addressing = 0<br>[2:0] Read = 000, Others reserved |
| rec_address | 64 | Meta → HBL | Memory address |
| req_length | 14 | Meta → HBL | Data length (bytes) |
| req_opID | 6 | Meta → HBL | Operation identifier |
| req_port_num | 2 | Meta → HBL | Port number |
| req_dma_num | 5 | Meta → HBL | Channel number |
| req_client | 8 | Meta → HBL | Requesting client |
| req | 1 | Meta → HBL | REQUEST queue request |
| req_accept | 1 | HBL → Meta | Grant REQUEST queue request |
| Error Flag | | | |
| req_errors | 1 | HBL → Meta | Flag to report errors. Asynchronous with respect to read REQUEST events |

TABLE 3 lists the RESPONSE queue signals employed on a meta interface in an embodiment of the invention.

TABLE 3

| Signal Name | Size | From → To | Description |
|---|---|---|---|
| Transaction Type and Control Signals | | | |
| resp_cmd | 8 | HBL → Meta | Command requests: Completion with data, completion w/o data<br>[7:5] Reserved<br>[4:3] Error type<br>[2:0] Completion with data = 001, completion w/o data = 110 |
| resp_address | 64 | HBL → Meta | Memory address |
| resp_length | 14 | HBL → Meta | Data length (bytes) |
| resp_opID | 6 | HBL → Meta | Operation identifier |
| resp_port_num | 2 | HBL → Meta | Port number |
| resp_dma_num | 5 | HBL → Meta | Channel number |
| resp_client | 8 | HBL → Meta | Requesting client |
| resp_ready | 1 | HBL → Meta | Validate RESPONSE queue request |
| resp_cmd_status | 4 | HBL → Meta | Timeout has occurred |
| resp_accept | 8 | Meta → HBL | Grant RESPONSE queue request |
| resp_complete | 8 | HBL → Meta | Fragment complete |
| transfer_complete | 8 | HBL → Meta | Transfer complete |
| Data and Data Control Signals | | | |
| data | 128 | HBL → Meta | Data |
| resp_byteenable | 16 | HBL → Meta | First/last byte enable |
| data_status | 4 | HBL → Meta | Transfer status:<br>[3:2] Error Type<br>[1:0] Reserved |
| data_valid | 8 | HBL → Meta | Meta acknowledges burst transfer |

TABLE 4 lists the ACKNOWLEDGEMENT queue signals employed on a meta interface in an embodiment of the invention.

TABLE 4

| Signal Name | Size | From → To | Description |
|---|---|---|---|
| Transaction Type and Control Signals | | | |
| ack_cmd | 8 | HBL → Meta | Command requests: Completion with data, completion w/o data [7:5] Reserved [4:3] Error type [2:0] Completion with data = 101, completion w/o data = 110 |
| ack_cmd_status | 4 | HBL → Meta | Timeout has occurred |
| ack_address | 64 | HBL → Meta | Memory address |
| ack_length | 14 | HBL → Meta | Data length (bytes) |
| ack_opID | 6 | HBL → Meta | Operation identifier |
| ack_port_num | 2 | HBL → Meta | Port number |
| ack_dma_num | 5 | HBL → Meta | Channel number |
| ack_client | 8 | HBL → Meta | Requesting client |
| ack_ready | 1 | HBL → Meta | Validate ACKNOWLEDGEMENT queue request |
| ack_accept | 8 | Meta → HBL | Grant ACKNOWLEDGEMENT queue request |
| ack_complete | 8 | HBL → Meta | Fragment complete |
| ack_transfer_complete | 8 | HBL → Meta | Transfer complete |

Verification

In one embodiment of the invention, a verification environment and methods are provided for verifying a complex ASIC (Application Specific Integrated Circuit), such as an input/output device, in or with multiple architectures. For example, a network interface unit (NIU) core may be verified for operation with multiple different host buses (e.g., SIU, PCIe, HT) within a single verification environment.

A verification environment in this embodiment may be logically divided into three components: a testbench comprising a model of an input/output device (i.e., the Device under Test or DUT), a transmit path for the DUT, and a receive path for the DUT. Each test performed on a DUT within the environment may enable either or both transmit and receive paths. Therefore, for a NIU DUT a stimulus generator may mimic either the host side of the NIU (i.e., to test packet transmission) or an external input to the NIU (i.e., to test packet receipt); a checker would operate at the other end of the NIU.

Within a given testbench for a device or chip, a stimulus generator and a response checker cooperate to provide end-to-end checking of three types of system calls: PIO (Programmed Input/Output) reads and writes, host memory reads and writes, and interrupts.

Models are chosen at compile time and may comprise any combination of software modeling and actual hardware. The architecture (e.g., host bus) with which or in which a device is being tested is initialized with a set of initialization routines, and implements call-back functions to facilitate the response checker's work. The call-back functions may be routed through a generic task so that behavior is identical for the different architectures.

Different test layers may be maintained to test different features of a DUT, and may be written in the VERA language, Verilog, VHDL (VHSIC (Very High Speed Integrated Circuit) Hardware Description Language) or a higher level programming language. Test layers are dynamically bound to the verification environment as needed.

An embodiment of a verification environment described in this section may be implemented to verify a complex ASIC, such as NIU 110 of FIG. 1, under operation with multiple different host system bus architectures. In this embodiment, and contrary to traditional methods of verification, no assumptions are made regarding the behavior of individual blocks or modules of the ASIC or of internal states of the chip. Instead, the chip is validated by observing end-to-end behavior from a stimulus generator at one end to a response checker at the other.

The stimulus generator may be programmed to exercise only high-level attributes of the chip. The ASIC may therefore be validated at a macro level instead of a micro level.

The testbench tracks stimuli input to the chip to predict what should happen at the other end, such as what area of memory should be written to or read from, what I/O call or interrupt should be issued, and so on. Assuming a representative variety and quantity of stimulus patterns are provided to the ASIC, all or most functionality of the chip can be verified by comparing the chip's responses with expected responses.

One skilled in the art will appreciate how this methodology differs from traditional verification strategies, wherein each separate block or module of an ASIC would be separately and exhaustively tested. Pseudo models of each block under test (BUT) would be created and the accuracy of the verification would hinge on the accuracy of the block modeling.

Traditional verification methods do not scale well, because each block's model is tied to that specific block. If the block changes, its model must also be changed and revalidated, and models of other blocks (e.g., of adjacent blocks) may also have to be revalidated if the blocks' interaction has been altered. Thus, different versions of the ASIC (e.g., for operation with different host buses) would have different functionality, and models generated for verifying one version's blocks would not be usable with another version's.

Because checking is performed only at the periphery of a DUT in an embodiment of the invention, termination points for checking can be moved (e.g., as the DUT is modified) without have to recreate the checkers. In addition, changes to inter-module or inter-block interfaces, the datapath, design blocks obtained from third parties, and vendor-specific libraries do not affect the verification environment, unlike with traditional verification schemes.

For example, a single set of simulation vectors may be implemented to test an NIU in multiple configurations, such as with an SIU bus model, with SIU RTL (Register Transfer Logic) and an L2 memory model, with SIU RTL and L2 memory RTL, with a PCIe bus or model, etc.

Figure 5:
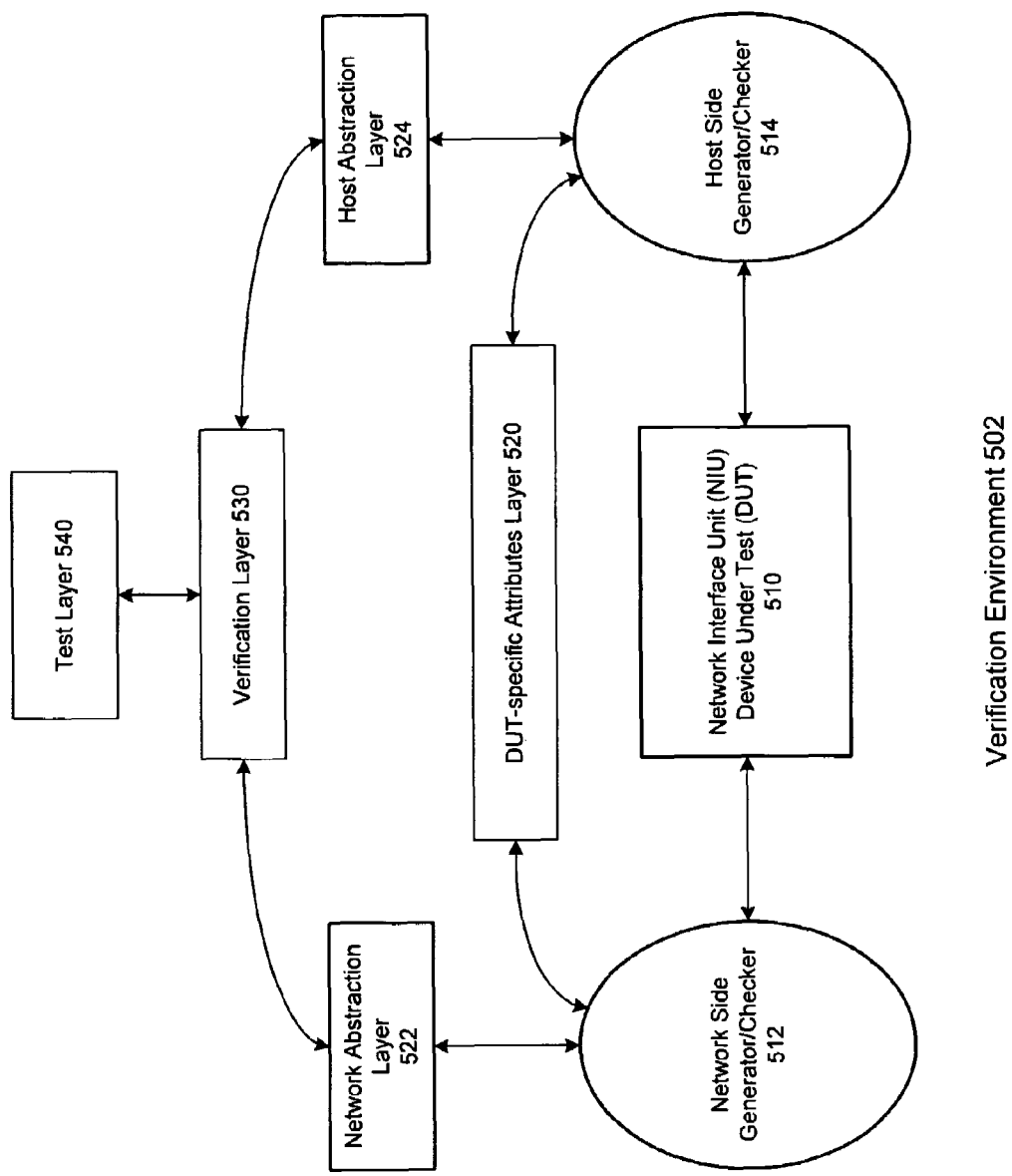
FIG. 5 is a block diagram depicting a verification environment for verifying a complex ASIC, in accordance with an embodiment of the present invention.

FIG. 5 illustrates a verification environment according to an embodiment of the invention. DUT 510 is a network interface unit core that acts as a bridge between an Ethernet interface and a host bus. The NIU may connect to the host system via any of multiple different host bus protocols, such as PCIe, SIU, HT, etc. The NIU supports PIO (Programmed Input/Output) accesses and may be able to operate with different page sizes (e.g., 4 KB, 8 KB) for different operating systems.

Hardware functions of the DUT that may be verified include (but are not limited to) packet processing functions, packet movement function and system functions.

Illustrative packet processing functions include support for IPv4/IPv6 packets, layer 2-4 classification and flow identification, hardware checksum for Rx and Tx paths (e.g., CRC-32, TCP/IP), jumbo frame support, VLAN, and IP multicast. Illustrative packet movement functions include support for 16 Rx and 24 Tx DMA channels, support for transmit gather of up to 15 descriptors, TCP receive re-assembly, TCP re-assembly scatter of up to 4 descriptors, and jumbo frame support. Illustrative system functions include: hypervisor (hyper privilege supervisory partition software) virtualization and partitioning, interface loopbacks (internal and external), FCRAM 2 interfacing for extended table lookup, support for up to 128 MSIs (Message Signaled Interrupts), support for an x8 PCIe interface, etc.

External interfaces of an NIU DUT may include any or all of the following (and/or others): PCIe, FCRAM, EEPROM, GPIO, 1G RGMII, 10G SERDES, SIU, a proprietary PIO interface such as NCU (Non-Cacheable Unit) of Sun Microsystems, Inc., and so on. The illustrated embodiment of the invention may be readily modified to verify other types of complex ASICs.

In verification environment 502, the end-to-end operation of NIU DUT 510 is being verified with network side generator/checker 512 and host side generator/checker 514. When the receive path of the NIU DUT is active, network side generator/checker 512 generates stimuli and feeds them to the DUT; host side generator/checker 514 checks the result. When the transmit path of the NIU DUT is active, the host side generator/checker generates stimuli and the network side generator/checker checks the result.

DUT-specific attributes layer 520 of the verification environment incorporates device-specific functions of the DUT (e.g., as software programming models). Based on the various programming modes reflected in attributes layer 520, the stimulus generators generate appropriate stimuli to validate a particular feature of NIU DUT 510. The response checkers can query layer 520 to verify expected behavior for a stimulus.

Network abstraction layer 522 and host abstraction layer 524 represent network and host entities the DUT can operate with. Each abstraction layer translates a generic host message (e.g., from verification layer 530) into a network interface-specific or host-specific message, which is communicated to the appropriate functional model.

Communication between verification layer 530 and an abstraction layer may employ a set of well-defined APIs (Application Program Interfaces), which may be setup from a system level perspective. In particular, tasks and function calls may be defined to mimic APIs used by a host abstraction layer in a working system, but the tasks and function calls will support multiple types of hosts or host buses.

The verification layer also communicates with an abstraction layer through event triggers called callbacks. Callbacks are used by the verification layer to synchronize the environment for stimulus patterns and results checking.

Verification layer 530 promotes communication between a stimulus generator, at one end of a receive or transmit path, and a response checker at the other end. To promote scalability, the verification layer handles these communications with message passing queues.

Test layer 540 defines or specifies attributes for testing DUT 510. Test attributes may be expressed as a test matrix indicating the types of packets to generate, the packet options to exercise, etc. The underlying abstraction layer(s) and stimulus generators use this information to generate appropriate packets, errors and/or other signals to verify DUT 510. Test layer 540 is thus generic and not tied to any particular DUT or testbench, and can therefore be used for testing multiple different DUTs.

Verification environment 502 may be used to verify operation of a different DUT or testbench by replacing DUT 510 and DUT-specific attributes layer 520. In one embodiment of the invention, different versions of an NIU core designed to operate with different host buses may be verified using verification environment 500 and replacing only the DUT, DUT-specific attributes layer and low-level DUT-host bus interface models.

In one model, multiple mutually exclusive linear message passing queues within verification layer 530 feed into one independent linear queue that is dequeued in order. In another model, one independent linear queue feeds into multiple mutually exclusive independent linear queues (e.g., one for expected posted writes, one for expected non-posted writes) that can be dequeued in random order.

For example, DUT 510 may include multiple read DMAs feeding a single transmit port, in which case verification layer 530 may model this with multiple message passing queues feeding a single linear queue. Conversely, a single receive port may feed multiple write DMAs, and/or a single write DMA may be invoked in either a polling or interrupt mode, and all write DMAs' queues may lead to a single packet checker.

Each message passing queue need not have any knowledge of any other queues. This promotes abstraction and allows each queue to be separately and independently added or removed. For example, DMA engines in an NIU core being verified can be started, stalled or reset at any time (e.g., randomly), without requiring any consideration or modification of other running DMA engines.

In an embodiment of the invention, as stimuli (e.g., packets, errors) are passed through the DUT, a token message is passed through the verification layer to allow the checker to verify the correctness of the DUT's operation. A token message, or simply token, identifies the attributes of the corresponding stimulus (e.g., packet size, options, CRC (Cyclic Redundancy Check)). A token may include the entire packet or other stimulus, or any portion thereof.

As the token is passed through the verification layer from the stimulus generator to the checker, its contents may be used to determine where the packet should be stored (if the stimulus is a packet and not, for example, an error). Token contents may also be used to determine which DMA engines should be used within the DUT, which if any interrupt(s) should be thrown, and virtually any other behavior that should be observed in the DUT. A token may be modified en route to identify the expected DUT behavior.

Thus, in embodiments of the invention described herein, determinations of how a DUT should behave in response to a stimulus are made in parallel with the DUT's processing of the stimulus, thereby allowing the verification environment to shadow the DUT's operation. This differs from traditional verification methods in which input patterns are compared to observed behavior after multiple stimuli are passed through the DUT. For example, there is no need to snoop into the RTL while a DUT is processing a packet, because the verification is being performed end-to-end instead of examining exchanges between blocks within the DUT.

In one embodiment, a token is issued by a stimulus generator when it issues the corresponding stimulus toward the DUT, and is consumed by the stimulus checker at the other end of the transmission path. The token may be parsed and/or modified at any number of points along the path to examine or predict the DUT's expected behavior.

In the transmit path, a queue order manager may be implemented in the verification layer to handle transmissions from multiple read DMAs through a single transmit port and verify correct ordering. In particular, the order in which packets are transmitted from the DUT may be examined to ensure it matches the order in which the queue order manager provides the corresponding token messages to the stimulus checker.

Figure 6:
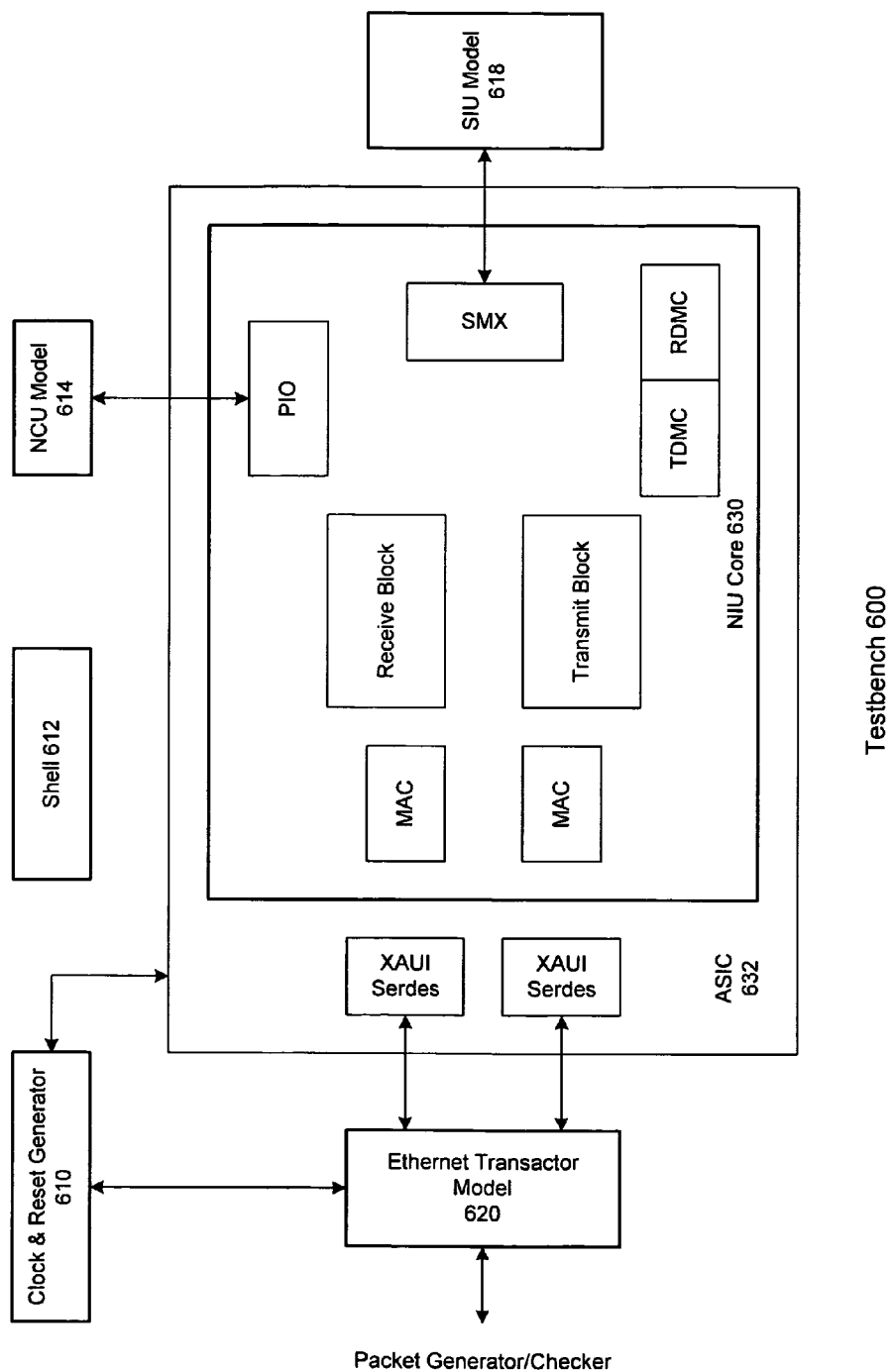
FIG. 6 is a block diagram depicting a testbench that may be employed in a verification environment, in accordance with an embodiment of the present invention.

FIG. 6 demonstrates a testbench for verifying an NIU core in an embodiment of the invention. Testbench 600 is a model for verifying end-to-end operation of NIU core 630, which may be implanted in ASIC 632 (e.g., a stubbed out CPU module). In the illustrated embodiment of the invention, testbench 600 instantiates clock & reset generator 610, shell 612, NCU model 614, SIU model 618 and Ethernet transactor model 620.

Clock & reset generator 610 generates and manages various clocks within NIU 630, determines the mode (e.g., bypass, regular) in which system PLLs (Phase Locked Loops) operate, generates hardware resets for the NIU and may model a reset generator block. Shell 612 is an interface to the testbench program code.

NCU model 614 is a model of a proprietary non-cacheable PIO interface unit. SIU model 618 is a model of a System Interface Unit host bus, and includes a stimulus generator/checker for verifying operation of NIU core 630 with an SIU host bus. Ethernet transactor model 620, in this embodiment, instantiates two 10G port interfaces. Testbench 600 may comprise software and/or hardware components. For example, the XAUI Serdes may be replaced with dummy models of Serdes as a compile-time option. Testbench 600 may also be viewed as encompassing a stimulus generator or checker (e.g., generator/checker 512 of FIG. 5).

Figure 7:
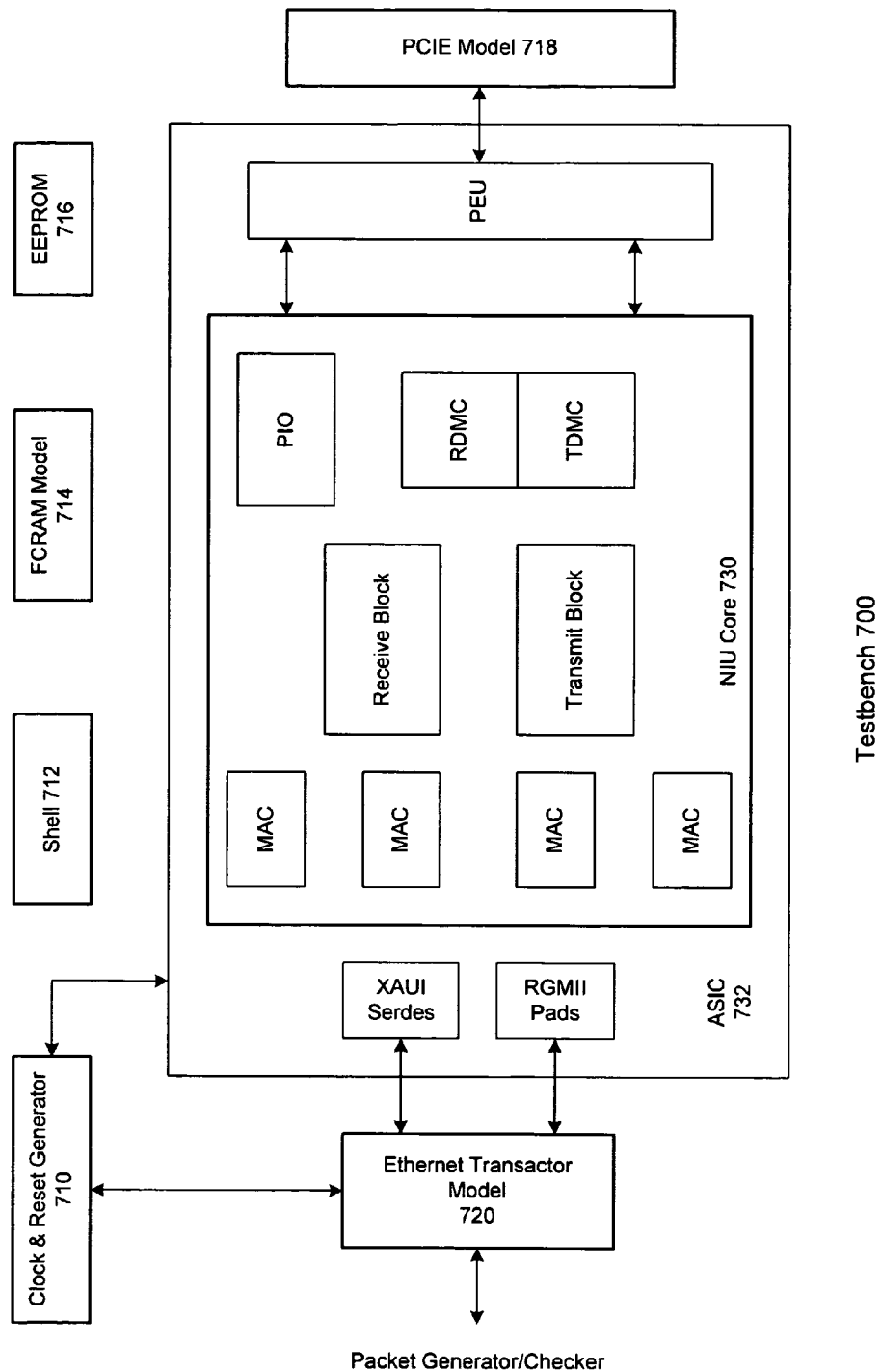
FIG. 7 is a block diagram depicting another testbench that may be employed in a verification environment, in accordance with an embodiment of the present invention.

FIG. 7 demonstrates another testbench for verifying a different type of NIU core in an embodiment of the invention. NIU core 730, implanted in ASIC 732 is configured for operation with a PCI Express host bus, which is modeled by PCIe model 718. PCIe model 718 includes a stimulus generator/checker for verifying operation of NIU 730 with a PCIe host bus.

Testbench 700 also includes clock & reset generator 710, which generates and manages various clocks within NIU core 730, determines the mode in which system PLLs operate and generates hardware resets. Shell 712 is an interface to the testbench program code (e.g., to translate between Verilog (used by the DUT) and C or VERA (used by the verification layer). FCRAM 714 models or is a Fast Cycle Random Access Memory. EEPROM 716 may store a device driver and/or parameters for operating or configuring the DUT. Ethernet transactor model 720 instantiates two 10G port interfaces and two 1G interfaces. Testbench 700 may also be viewed as encompassing a stimulus generator or checker (e.g., generator/checker 512 of FIG. 5).

A verification environment comprising a testbench such as testbench 600 or testbench 700 models a host computer system in at least three primary ways, in order to hide host bus low-level function calls: PIO interfaces (PIO reads and writes), host memory accesses (system memory reads and writes) and interrupts. Illustratively, a generic interrupt message queue is modeled for message parsing and for spawning appropriate ISRs (Interrupt Service Routines).

A host model can be configured or exercised to test the transmit path and/or the receive path of an I/O device, and will generate appropriate stimuli at one end and verify the response or behavior at the other. A host model is chosen at compile time and initialized with a set of initialization routines, and implements callback functions to facilitate the response verification.

Within the test layer are all the tests necessary to target a particular feature of the DUT. Illustratively, the tests are written in VERA and dynamically bound to the verification environment.

Stimulus generators and response checkers communicate by passing message tokens. Tokens carry sufficient information to verify the correct functioning of the DUT.

In the transmit path, a token is generated to reflect a packet or descriptor to be passed to the DUT. The token is passed through the transmit path model (within the transmit testbench), where the attributes associated with the Token are modified as required, and to the response checker.

In the receive path, a token is generated by a packet generator or logic (e.g., a wrapper) associated with the generator. The token is passed through the receive path model (within the receive testbench), where attributes are changed as necessary, and to the host side checker.

As described above, in one embodiment of the invention, a verification environment for testing an input/output device under test includes the following components: DMA programming utilities for checking DMA operation, a transmit path model for testing the DUT's Tx path, a receive path model for testing the device's Rx path, a host bus interface to a model of a host bus, and a test layer for executing the testing.

In this embodiment, DMA programming utilities that work with both the Tx and Rx paths manage some or all of the following functions (and/or others):

(1) Buffer and packet address management. These functions add or reclaim buffer space based on test requirements. New buffers may be added to a descriptor ring by a "kick" command from a test. A buffer may be reclaimed once the header pointer is successfully read by hardware.

(2) Address virtualization. DMA classes maintain all context associated with translation of a virtual address to a real address needed for packet read/write. The Sparse Memory model provides a set of functions that can be called either by a test or these DMA utilities. Address virtualization functions are used to set up contexts related to virtualization.

(3) PIO Virtualization. PIO operations may be virtualized, similar to the virtualization of memory reads and writes, and the verification layer will support the virtualization (e.g., in a host abstraction layer).

(4) Interrupt service routine management. Each DMA within a DUT can behave as an independent logical device, and can therefore issue its own interrupts. Or, multiple DMAs may be bound as a single logical device. Based upon test requirements, a user can bind a DMA class to the appropriate bind table within the interrupt manager. Upon receipt of an interrupt, the interrupt manager spawns the appropriate ISR.

(5) Maintenance of shadow copy of descriptor cache. To facilitate accurate prediction of DUT operation, posting of new descriptors is done using functions provided with the Tx and Rx DMA classes which maintain shadow copies of the descriptors programmed into system memory. These copies are used by a response checker to predict the behavior of a path.

(6) Error Modeling. Virtually any type of packet error may be modeled in the verification layer, and the token corresponding to the packet will identify the error so that the checker can ensure the DUT responded correctly. To enable error modeling, the verification environment may allow dynamic insertion and/or removal of packets into or from the DUT (e.g., a DMA queue), to model the loss of a packet for example.

The transmit path model of a DUT includes some or all of the following components (and/or others):

(1) Host packet generator. A packet generator is a copy of an external packet generator, instantiated with a different operating mode, because the host packet generator may use the same set of data structures as the external packet checker.

(2) Transmit DMA setup utilities. These utilities are responsible for generating a packet within memory, and adding appropriate buffers within the descriptor ring. The following pseudocode provides an example of how the utilities may operate:

```
foreach dma_id
while (some conditions) {
  ip_packets[ ] = generate_packets(pkt_gen_config);
  gather_list_info = create gather_list(ip_packets);
  for (i=0; i<gather_list_info.numofdescs; i++) {
    address = get_unique address( );
    write_pkt_to_memory(address, ip_packets, gather_list_info);
    create descriptors;
    add_descriptors(dma_id);
  }
  if(update_kick_register) {
    write_kick_register(dma_id);
  }
  generate_tokens;
}
```

A token generated by a transmit DMA setup utility is added to a linked list (e.g., one list per DMA). Based upon the kick value, the linked list is parsed and appropriate tokens are marked Valid so that they can be processed by the next model or entity in the transmit path. If a host bus-related error is injected through a callback mechanism, the error class of the appropriate entities is updated; the port model and packet checker can therefore accurately predict hardware behavior.

(3) Transmit port model. This component models a Deficit Round Robin (DRR) arbiter within the DUT's Tx path. After packets are generated, corresponding tokens are fed into the DRR input queue. Depending upon the bind information (e.g., obtained from the shadow copy of the device configuration), an appropriate entry is selected from the queue and sent to the next queue for end checking.

(4) Packet checker. The checker may be part of the Ethernet interface transactor. Tokens received from the DRR arbiter are processed for errors. An expected packet is constructed by the packet checker and compared (e.g., byte by byte) with the received packet.

(5) Transmit path performance measurement. To determine how well the transmit portion of the DUT performs. One illustrative measure of performance may involve determining the amount of time the DUT needed to output all input stimuli, and dividing that by the amount of data output.

Figure 8:
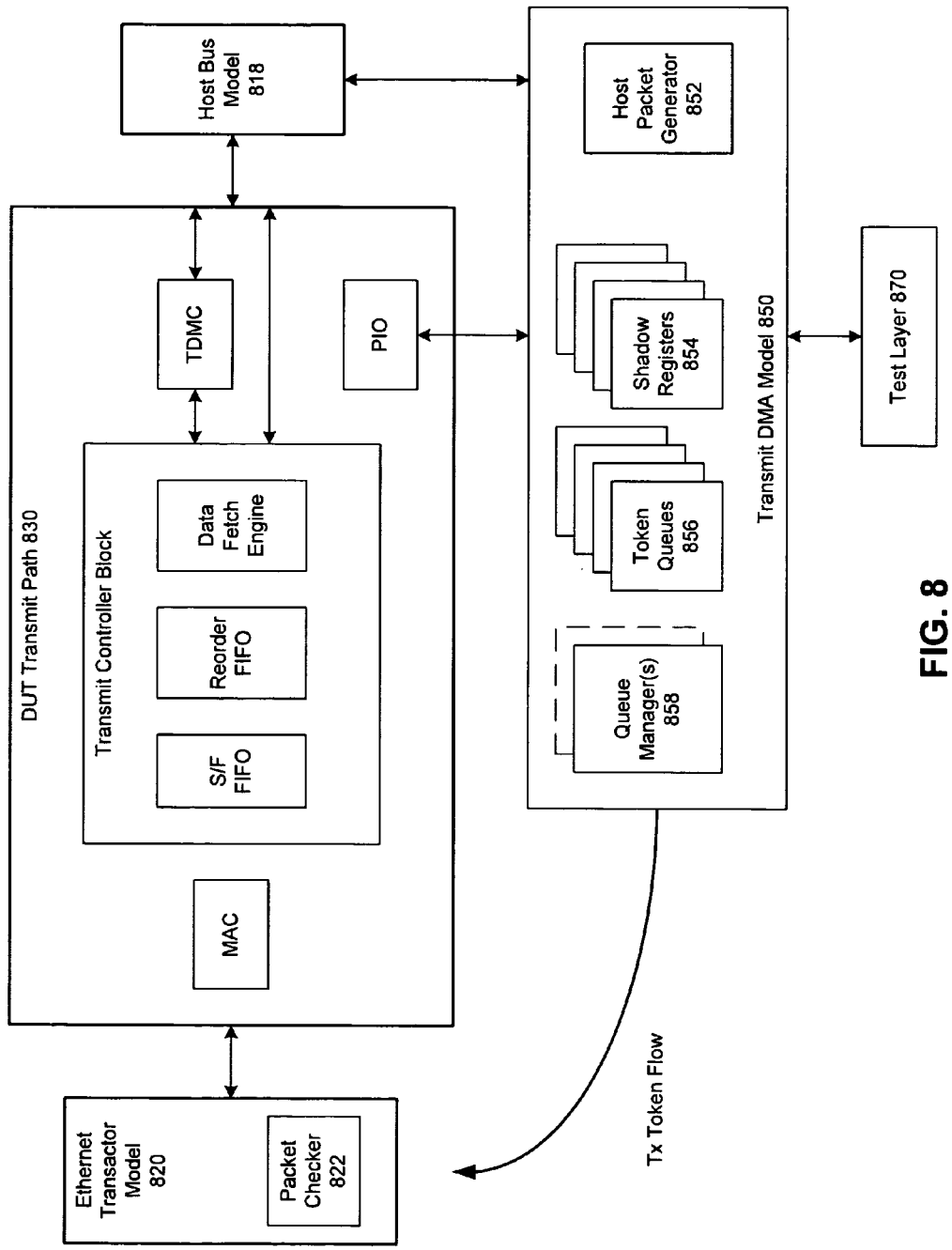
FIG. 8 is a block diagram depicting the interaction between models within a verification environment, for verifying the transmit path of an I/O device, in accordance with an embodiment of the present invention.

FIG. 8 demonstrates the interaction between models during the verification of an input/output device's transmit path, according to one embodiment of the invention. In this embodiment, DUT transmit path 830 includes several distinct blocks or modules, such as a transmit DMA, a PIO interface for programming the DUT, a MAC module, a transmit controller block, etc. The transmit controller block may include a data fetch engine for retrieving packets for transmission, a reorder queue, a store/forward queue and/or other entities.

Transmit DMA model 850 includes packet generator 852 for sending a test packet to the host bus model, shadow registers 854, token queues 856 and DMA utilities, and operates under the control of test layer 870. In this embodiment of the invention, transmit DMA model 850 maintains a separate set of shadow registers and a separate token queue for each transmit port of the DUT. The shadow registers mimic the status of the DUT during verification to reflect, for example, the number of active DMA engines, the kick of each DMA engine, data addresses that should be active, etc.

Transmit DMA model 850 also includes queue manager(s) 858 to service the token queues. The queue manager applies the same arbitration scheme applied by the DUT (e.g., round robin, deficit round robin) to service the token queues in the same order as the hardware. Illustratively, a separate queue manager may be implemented for each transmit DMA port, to manage use of the port by any number of DMA engines.

The Ethernet transactor model includes packet checker 822. Based on a token received from token queue 856, packet checker 822 generates a packet reflecting the expected response or behavior of a stimulus input at the other end of the DUT, and compares it to the packet received from the DUT (e.g., via the MAC module).

The receive path model of a DUT includes some or all of the following components (and/or others):

(1) Packet configurator. The packet configurator is responsible for generating packets through an Ethernet interface external to the DUT, and for initializing the DUT for verification and snooping the shadow registers, and is described in more detail below.

(2) Receive DMA model. This component models the DUT's receive DMA, and includes a set of setup utilities and a data flow predictor (described in more detail below). The model predicts the exact address at which a packet will be stored, and the associated completion ring entry. This information is passed to the response checker.

(3) Packet checker. Checks data written into the host by the DUT.

Figure 9:
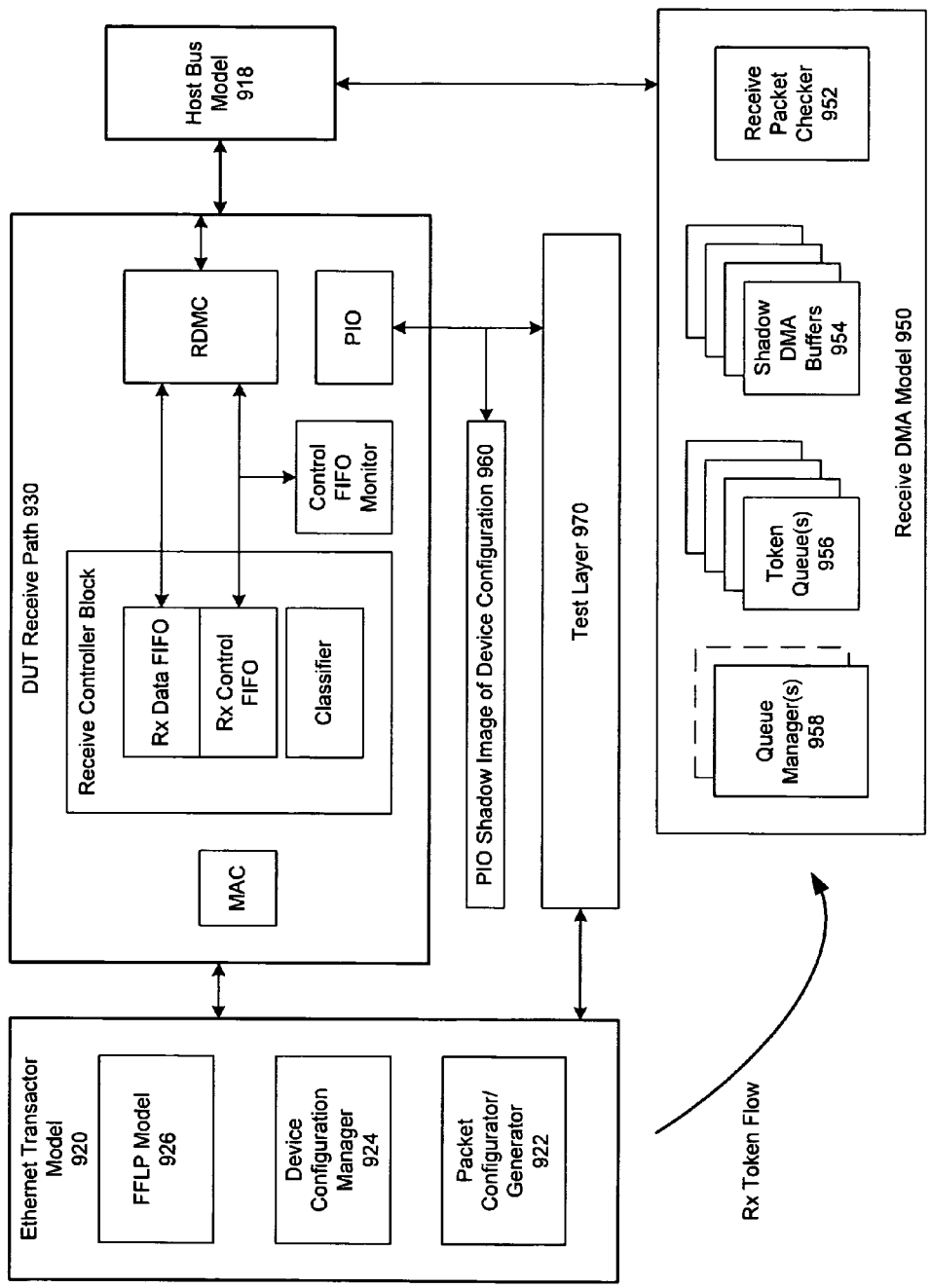
FIG. 9 is a block diagram depicting the interaction between models within a verification environment, for verifying the receive path of an I/O device, in accordance with an embodiment of the present invention.

FIG. 9 demonstrates the interaction between models during the verification of an input/output device's receive path, according to one embodiment of the invention. In this embodiment, DUT receive path 930 includes several distinct blocks or modules, such as a receive DMA, a PIO interface, a MAC module, a receive controller block, etc. The receive controller block may include queues for data and control, a traffic classifier and/or other entities. In the illustrated embodiment of the invention, the receive path is augmented with a control FIFO monitor configured to monitor the control FIFO for debugging and/or other purposes; the FIFO monitor need not always be active.

In FIG. 9, the packet configurator mentioned above comprises packet configurator/generator 922, device configuration manager 924 and FFLP (Flow Forwarding Learning Parser) model 926. Packet configurator/generator 922 maintains a shadow copy of the DUT's configuration (e.g., shadow image 960), which includes programming contexts and data associated with MAC (Medium Access Control) tables, VLAN (Virtual LAN) tables, TCAM (Ternary Content Addressable Memory) and FCRAM. It accepts input test parameters from test layer 970, containing information such as an expected RDC (Receive DMA Channel) table number and/or DMA number of a packet, and a path for the classifier to choose to reach the RDC table number for each packet.

Packet configurator/generator 922 predicts the packet header that will be generated to match the conditions specified by the test parameters, and uses it to generate a packet to be input to the DUT. When a packet is generated, a token is also generated and passed through the verification layer.

Device configuration manager 924 is responsible for initializing the DUT, including classification tables (implemented as RAM), based on device configuration data received from test layer 970. The configuration manager maintains a shadow copy of all PIO accessible registers within the MAC module(s) and receive controller block (e.g., PIO shadow image 960). The device configuration manager also supports backdoor initialization of tables to accelerate the simulation and for loading initialization routines.

FFLP model 926 receives flow information from packet generator/configurator 922. The FFLP model predicts control information and passes that information as part of the Rx token for the corresponding packet; the contents of the Rx token will be used by the control FIFO monitor/checker to pinpoint the exact source of a failure (if a failure occurs). The FFLP model need not be part of the normal (i.e., errorless) flow of an Rx token.

As described above, receive DMA model 950 includes setup utilities (not shown in FIG. 9) that comprise an extension of the DMA utilities used in the Tx path modeling. A Receive DMA setup function creates and reclaims buffers based upon kick parameters received from the test layer. It also maintains a shadow copy of registers within the RDMC and checks RTL (Register Transfer Language) behavior.

The receive DMA model also manages DMA buffers 954, which are allocated to the DMAs. A data flow prediction block of receive DMA model 950 predicts the exact destination address of packets received into host memory (through or part of host bus model 918) and their associated completion ring entries, based on tokens received from the packet generator. An Rx (or Tx) token may include information such as errors associated with or induced in the corresponding packet, the default DMA of the packet, control FIFO data, size, addresses, etc.

Thus, a token may include any or all attributes of the corresponding stimulus, and may also indicate the DUT's expected behavior regarding the stimulus (e.g., where in memory the packet should be stored, what DMA and/or port should be invoked). Receive DMA model 950 sends predicted destination addresses to host bus model 918 to facilitate its verification of packet integrity.

Receive DMA model 950 also includes a token queue 956 for each receive port in the DUT, and queue manager(s) 958 to service the token queues. The queue manager applies the same arbitration scheme applied by the DUT (e.g., round robin, deficit round robin) to service the token queues in the same order as the hardware. Illustratively, a separate queue manager may be implemented for each receive DMA port, to manage use of the port by any number of DMA engines.

The packet checker within host bus model 918 sets up appropriate callbacks (into host memory) based on packets' predicted destination addresses. Based on the predicted address of the packet from the Rx DMA model, the packet checker sets up appropriate callbacks. A callback function returns a particular value (e.g., true) when a write happens to the predicted address. If a packet does not make it to the checker (e.g., it was dropped by the DUT), a callback function will timeout and return an error status. Packets may be checked on each packet write or may be checked only after an entire completion ring entry is written.

Host bus models such as models 818 and 918 of FIGS. 8 and 9 include abstract layers comprising generic PIO modules and generic memory modules. A generic PIO module interfaces with appropriate bus functional models (BFMs).

In one embodiment, a generic memory module communicates with actual system memory through two simple tasks: readMem and writeMem. Each task accesses up to 64 bits of data with appropriate byte enable masks set. The memory module also has a callback manager for managing callback routines set during verification. A memory module may also perform other tasks, such as unique packet address generation, generation of masks for address virtualization, address translation functions based on masks, callback functions, etc.

A test layer such as test layers 870 and 970 of FIGS. 8 and 9 contains tests for verifying a DUT. Illustrative test requirements include: tests targeting a device core should be independent of the host bus and its behavior; tests should use initialization routines provided by the environment (new sets of tests can be added on a per-test basis); to promote portability, tests should be written using function calls.

Interrupt Verification

A verification environment includes an abstract model for verifying interrupts with different host buses. Because different hosts and host buses implement interrupts differently, the host bus models convert device-specific interrupt messages from the DUT into generic interrupt messages for further examination.

Upon receipt of an interrupt vector, a host bus-specific response checker compares the vector against its model in order to validate the interrupt. Any host bus-specific translation is checked at this level. After validation, a generic (i.e., not host bus-specific) interrupt message is placed in an interrupt queue for verification relating to the DUT functionality.

After verification at this level, control is given to a model of the interrupting device, which is responsible for (1) determining whether the interrupt was expected or should have been received, and (2) spawning an ISR bound to the issuing device.

In one embodiment, the interrupt handling portion of a verification environment includes some or all of the following components (and/or others):

(1) Host bus interrupt vector checker. This checker checks message correctness and determines whether the host translation is correct against its programmed table (e.g., programmed values in MSI/MSIx tables). Also, translates interrupt messages into a generic message format and queues them.

(2) Interrupt message queue. Queues messages from the host bus interrupt vector checker for the interrupt manager.

(3) Interrupt manager. Specific to the DUT (e.g., an NIU core). Dequeues generic interrupt messages from the interrupt message queue, checks basic sanity of the messages, detects interrupt device ID and passes messages to the corresponding model(s) of the DUT.

(4) Interrupt service routines (ISR). These routines process the generic interrupt messages.

(5) Interrupt device(s). These devices model the DUT's behavior.

Each device model registers itself with the interrupt manager by providing a handle to the ISR function, a choice of LDG (Logical Device Group) number, program timers, etc.

When a stimulus checker receives an interrupt associated with a particular stimulus, it reports the interrupt to its abstraction layer. The abstraction layer determines (e.g., with or through the verification layer) whether the interrupt was expected and/or whether the correct interrupt was received.

Error Verification

As part of error testing within a verification environment, both recoverable and non-recoverable errors may be verified. In the event of an error, hardware reports appropriate status to the verification software. For errors associated with a DMA, scheduling of that DMA may be turned off until software cleans up and reclaims the DMA.

Various errors may be purposefully inserted into the verification environment to check for expected behavior. In particular, errors may be inserted to verify non-blocking behavior between different DMAs and between different ports.

Illustrative types of error injection supported by a verification environment may include, but are not limited to, errors relating to the network, host bus, internal memory and software.

Network-related errors may be injected by the packet generator; the injected error type and associated error information is conveyed to the response checker within a token. The checker validates the DUT's behavior based on the error type and the expected response.

Illustrative network-type errors that may be injected include both packet errors (e.g., type errors, CRC errors, checksum errors) and link errors. In one embodiment, packet errors may be injected randomly and error information is conveyed in a token associated with the erroneous token. The receive path model predicts the flow of packets and checks for appropriate status (e.g., drop, no drop with updated status word).

Host bus-related errors allow for the testing of handling of errors relating to bus time-outs, errors in the host that are reported in the interface between the DUT and the host bus (e.g., a meta interface), transaction ID corruption (e.g., errors through PIOs that may corrupt a Transaction ID table of a meta interface), etc. Bus time-out errors and interface errors may be injected through callback functions.

Internal memory errors may be injected by PIO reads and writes to the DUT, and may include ECC errors and parity errors. The error checking portion of the verification environment captures PIOs to the device through a shadow register read, and passes appropriate information through tokens.

A Method of Verification

Figure 10:
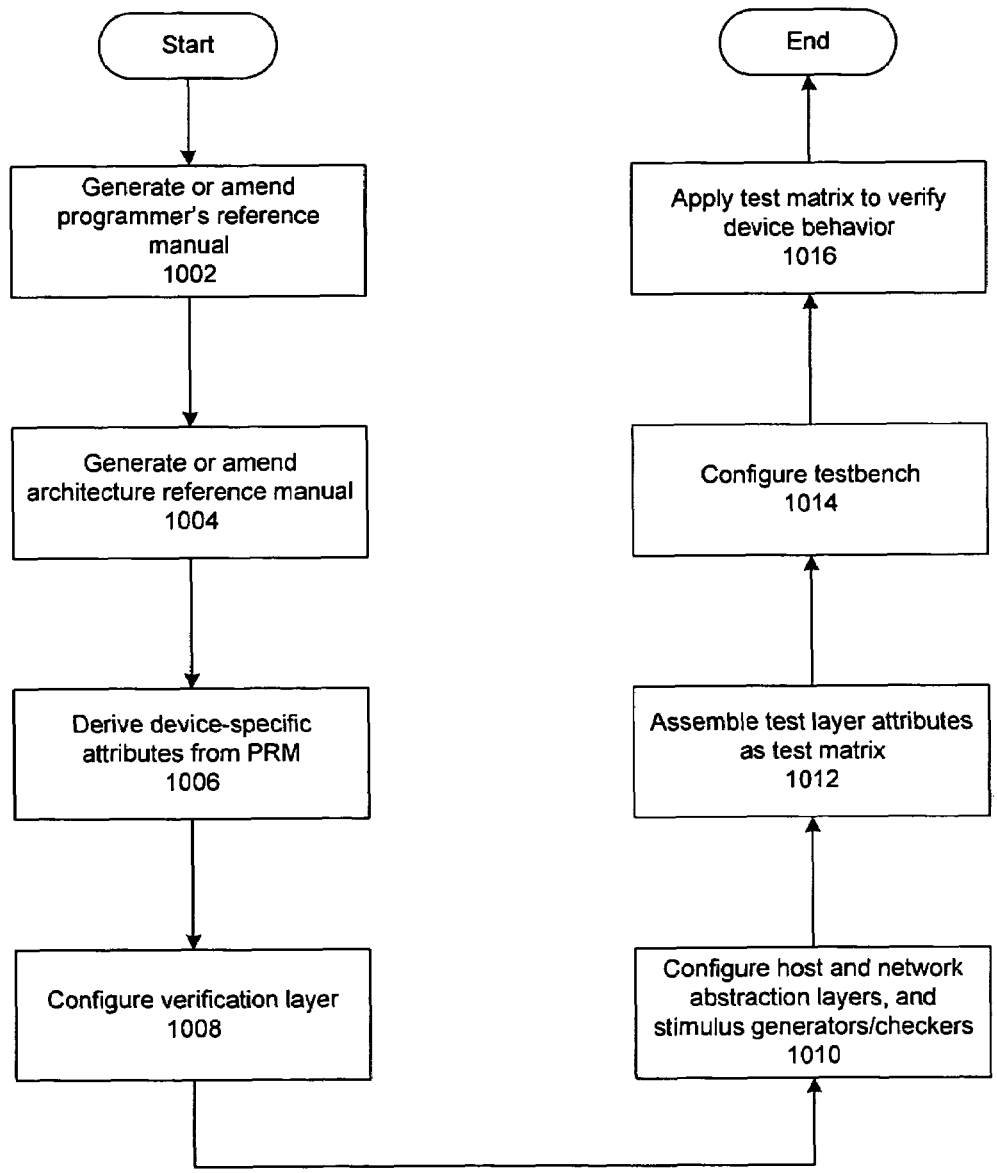
FIG. 10 is a flow chart demonstrating a method of end-to-end verification of a complex ASIC, in accordance with an embodiment of the present invention.

FIG. 10 is a flowchart demonstrating a method of configuring an end-to-end verification environment, according to one embodiment of the invention. Any number of the illustrated operations may be performed concurrently.

In operation 1002, a programmer's reference manual (PRM) is generated to reflect a software view of the hardware device being designed and verified. The PRM may identify the device's features and describe the software interface to the device. For example, the PRM may indicate the desired operating speed or throughput of the device, the level(s) of protocol processing it should perform, the number of DMA engines that should be incorporated, etc.

From the PRM, in operation 1004 an architecture reference manual (ARM) is configured to capture the physical design of the device that will allow it to meet the requirements laid out in the ARM. For example, the ARM may lay out the device's pin-out, the type of processor that will be used, the size of the device, the functional blocks that will be included, etc. The PRM and ARM may be modified at any time to reflect changes in the functionality or design of the device.

In operation 1006, device-specific attributes can be derived from the PRM, to facilitate configuration of the device-specific attributes layer of the verification environment. The device-specific attributes may incorporate code or programming models for implementing the desired number of DMA engines, for performing protocol processing, and so on, in light of other requirements spelled out in the PRM.

Using the device-specific attributes, in operation 1008 a verification layer can be configured to test the device-specific attributes. For example, the number of token message passing queues to implement may be drawn from the number of transmit DMAs and receive DMAs implemented in the device.

In operation 1010, the PRM and ARM are employed to configure the host and network abstraction layers and construct the stimulus generators and checkers.

In operation 1012, test layer attributes are assembled to enable the verification layer to initiate the generation of appropriate stimuli and corresponding tokens. As the device's design changes, the device-specific attributes layer, verification layer, abstraction layers and stimuli generator/checkers may be modified accordingly.

In operation 1014, a testbench is configured to test all or a portion of one design of the device. In different embodiments of the invention, a testbench may be viewed as encompassing just the device under test, or the DUT as well as ancillary components needed to control the DUT (e.g., clock, PIO interface), a stimulus generator and/or checker, etc.

In operation 1016, a test matrix is applied to verify the device. The test matrix identifies what is to be tested, and may be configured as a set of arguments or criteria for generating appropriate stimuli to test various device functionality. For example, the test matrix may identify a range of packet sizes to test, a set of packet options to exercise, types of packets to generate (e.g., TCP, IP, UDP), what types of errors to model, etc.

The test layer (e.g., test layer 540 of FIG. 5) applies the test matrix by identifying to the verification layer arguments or attributes that reflect the test matrix specification. The verification layer then instructs a stimulus generator to generate a set of appropriate packets and issues corresponding tokens to pass toward the checker.

In one embodiment of the invention, a verification layer such as verification layer 530 of FIG. 5 may be viewed as encompassing the network and host abstraction layers as well as the generator/checkers. For example, a stimulus checker may perform physical signaling in response to instructions from its abstraction layer, which is instructed to initiate an IP packet having certain attributes, or a UDP packet having other attributes, etc. The verification layer then conveys the corresponding tokens to the checker.

A stimulus generator/checker may thus be perceived as a physical layer signaling component, while its abstraction layer operates at the logical link layer and the verification layer at the transaction layer of the protocol stack. The test layer would then comprise the application layer. Because of the abstraction layers, the stimulus generator/checkers may implement virtually any type of signaling protocol (e.g., Ethernet, InfiniBand) under the same abstraction and verification layers.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A complex Application Specific Integrated Circuit (ASIC) having an interface for electrically coupling the ASIC to any of multiple host computer system buses, the ASIC comprising:
   an input/output component;
   first two-way host bus logic configured to translate communications between the input/output component and a first host bus, the host bus logic comprising:
      a request queue for issuing read requests and write requests from the input/output component to the first host bus;
      a response queue for receiving from the first host bus responses to the read requests;
      an acknowledgement queue for receiving from the first host bus acknowledgements of non-posted write requests;
   host meta logic configured to:
      convert a request from the input/output component into an appropriate bus transaction accepted by the first host bus;
      convert a host bus transaction including response or acknowledgement received by the first host bus into a format accepted by the input/output component; and
      issue a pseudo acknowledgement to the acknowledgement queue on the first host bus logic for non-posted write request if the first host bus does not implement an acknowledgement queue configured to issue acknowledgements of non-posted write 24 requests to the acknowledgement queue on the first host bus logic;
   a table to map an operation's operation identifier to the transaction identifiers of the corresponding first host bus transactions; and
   a meta interface configured to concurrently convey the requests, the responses and the acknowledgements between the input/output component and the first host bus logic.

2. The complex ASIC of claim 1, further comprising:
   at least one additional host bus logic configured to translate communications between the input/output component and an additional host bus.

3. The complex ASIC of claim 1, wherein the host meta logic is further configured to report to the input/output component completion of non-posted write requests in order with completion of posted write requests.

4. The complex ASIC of claim 1, wherein the input/output component is a Network Interface Unit.

* * * * *

UNITED STATES PATENT AND TRADEMARK OFFICE
CERTIFICATE OF CORRECTION

| | | |
|---|---|---|
| PATENT NO. | : 7,500,046 B1 | |
| APPLICATION NO. | : 11/418901 | |
| DATED | : March 3, 2009 | |
| INVENTOR(S) | : Rahoul Puri et al. | |

It is certified that error appears in the above-identified patent and that said Letters Patent is hereby corrected as shown below:

On title page, second inventor's name spelled incorrectly please replace the name "Arvind Srinivsan" with --Arvind Srinivasan--.

In claim 1 (at column 24, line 18), please delete the number "24".

Signed and Sealed this

Fifth Day of May, 2009

JOHN DOLL
*Acting Director of the United States Patent and Trademark Office*